US006591301B1

United States Patent
Li et al.

(10) Patent No.: US 6,591,301 B1
(45) Date of Patent: Jul. 8, 2003

(54) METHODS AND SYSTEMS FOR CONTROLLING NETWORK GATEKEEPER MESSAGE PROCESSING

(75) Inventors: Xuewen Li, Cary, NC (US); Samuel H. Christie, IV, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/327,049

(22) Filed: Jun. 7, 1999

(51) Int. Cl.[7] .............................................. G06F 13/00
(52) U.S. Cl. ........................ 709/229; 709/249; 709/311; 370/401
(58) Field of Search ................................ 709/217, 218, 709/219, 227, 229, 238, 249, 250, 311, 313; 370/352, 385, 386, 401

(56) References Cited

U.S. PATENT DOCUMENTS 4,885,780 A * 12/1989 Gopal et al. ................. 379/221
5,548,533 A *  8/1996 Gao et al. .................... 709/235
6,134,216 A * 10/2000 Gehi et al. ................... 370/231
6,333,931 B1 * 12/2001 LaPier et al. ................ 370/385

OTHER PUBLICATIONS

Toga, J. et al, "ITU–T Standardization Activities for Interactive Multimedia Communications on Packet–Based Networks: H.323 and Related Recommendations," Computer Networks and ISDN Systems, NI, vol. 31, No. 3, pp. 205–223, North Holland Publishing, Amsterdam, Feb. 11, 1999, XP000700319, ISSN: 0169–7552.

Anquetil, L–P et al., "Media Gateway Control Protocol and Voice Over IP Gateways," Electrical Communications, pp. 151–157, Alcatel, Brussels, Belgium, Apr. 1, 1999. XP000830045, ISSN: 0013–4252.

Arango et al., "Media Gateway Control Protocol (MGCP)," Feb. 21, 1999.

International Telecommunication Union study, Skran, "Proposed Revision of Recommendation H.323—Packet–Based Multimedia Communications Systems," Oct. 1997.

International Telecommunication Union, "Call Signaling Protocols and Media Stream Packetization for Packet Based Multimedia Communications Systems," Mar. 25, 1997.

Northern Telecom, "DMS–100 Family System Description," Dec. 1988.

DataBeam H.323 Developer's Toolkit, "A Primer on the H.323 Series Standard, Version 2.0," Mar. 5, 1999.

DataBeam H.323 Developer's Toolkit, "H.323 Version 2—Overview," Mar. 5, 1999.

U.S. patent application Ser. No. 09/249,696, Li et al., filed Feb. 12, 1999.

* cited by examiner

Primary Examiner—Viet D. Vu
(74) Attorney, Agent, or Firm—Withrow & Terranova, PLLC

(57) ABSTRACT

Methods and systems for controlling network gatekeeper message processing include overload control routines executed by a network gatekeeper to prevent the network gatekeeper from crashing during overload conditions. The overload control routines are executed in a predetermined order so that messages relating to calls in progress are preferentially processed over messages relating to newly originating calls. Fault detection routines detect protocol stack and application level faults of a network gatekeeper.

42 Claims, 13 Drawing Sheets

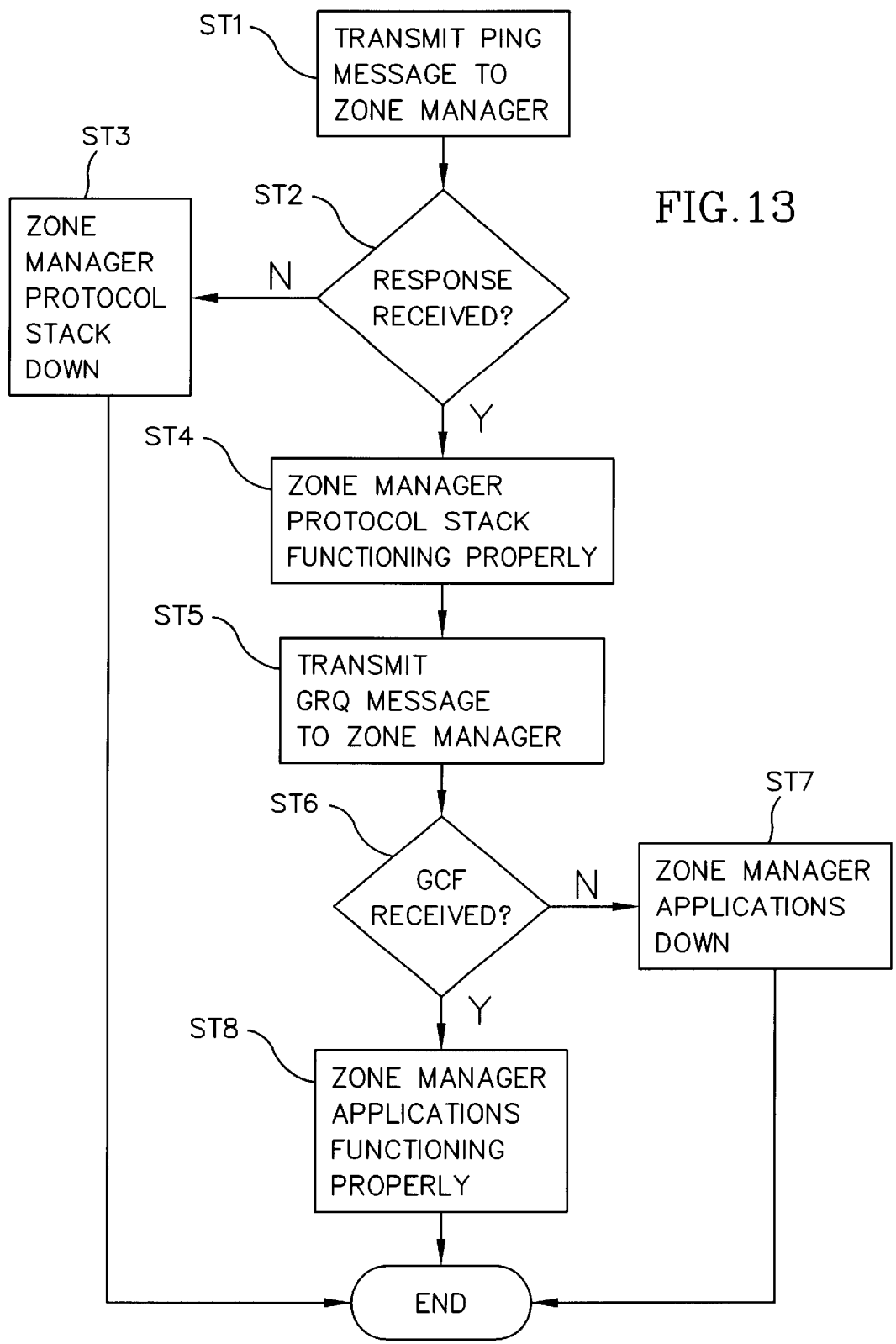

METHODS AND SYSTEMS FOR CONTROLLING NETWORK GATEKEEPER MESSAGE PROCESSING

TECHNICAL FIELD

The present invention relates generally to methods and systems for controlling a network gatekeeper. More particularly, the present invention relates to methods and systems for controlling message processing by an H.323 gatekeeper.

RELATED ART

H.323 is a set of recommendations from the International Telecommunications Union (ITU) for multi-media communications over local area networks (LANs) that do not provide guaranteed quality of service (QoS). These networks are commonly used in corporate and educational institutions. Exemplary packet-switched networks that do not guarantee quality of service include TCP/IP, UDP/IP, and IPX over Ethernet, Fast Ethernet and Token Ring. H.323 provides recommendations for communication between voice-only handsets, video conferencing stations, and other devices capable of transmitting voice, video, and data packets over such networks.

H.323 defines four major components for a network-based communication system: terminals, gateways, gatekeepers, and multi-point control units. Terminals are client endpoints connected to a LAN that provide real-time, two-way communications. A terminal may include a telephone capable of transmitting voice packets over a network, a video conferencing station capable of transmitting voice and video over a network, or a computer capable of transmitting voice, video, and data over a network. A gateway is an optional element of an H.323 network that provides translation between transmission formats and between communications procedures. For example, a gateway may establish links between H.323 terminals and analog public switched telephone network (PSTN) terminals. Thus, gateways function as translators between H.323 compliant devices and non-H.323 compliant devices.

A gatekeeper is the most important part of an H.323 enabled network. An H.323 gatekeeper functions as the central point for all calls within its zone and provides call control services to the registered endpoints. FIG. 1 illustrates a conventional H.323 gatekeeper and an H.323 zone. In FIG. 1, an H.323 gatekeeper 100 manages message traffic in an H.323 zone 101. An H.323 zone is defined by the collection of terminals, gateways, and multi-point control units managed by a single gatekeeper.

In the illustrated example, the H.323 zone 101 spans multiple networks 102 and 103 connected by routers 104 and 105. The H.323 zone 101 includes terminals 106–110 that transmit packets containing multi-media data to each other in accordance with H.323 recommendations. A gateway 111 translates between transmission formats and communications procedures. A multi-point control unit (MCU) 112 supports conferences between three or more endpoints.

Gatekeepers perform two important call control functions. The first function is address translation from LAN aliases for terminals and gateways to IP or IPX addresses, as defined in the Registration, Admission, Status (RAS) specifications included in ITU Recommendation H.225. The second function is bandwidth management, which is also described in ITU Recommendation H.225. For example, a network manager may have a specific threshold for the number of simultaneous conferences on a local area network (LAN). The gatekeeper can refuse to make connections once the threshold is reached. The effect of refusing to make connections is to limit the total conferencing bandwidth to some fraction of the total available network bandwidth. The remaining bandwidth may be used for e-mail, file transfers, and other LAN protocols.

An optional, but valuable, feature of a gatekeeper is the ability to route H.323 calls. By routing a call through a gatekeeper, the call can be controlled more effectively. Service providers need this ability in order to bill for calls placed through their networks. This service can also be used to re-route a call to another endpoint if a called endpoint is unavailable. In addition, a gatekeeper capable of routing H.323 calls can assist in making decisions involving balancing among multiple gateways. For instance, if a call is re-routed through a gatekeeper, that gatekeeper can then re-route the call to one of the many gateways based on a balancing algorithm. While a gatekeeper is logically separate from H.323 endpoints, vendors may incorporate gatekeeper functionality into physical implementation of gateways and MCUs.

A gatekeeper is not required in an H.323 system. However, if a gatekeeper is present, terminals must make use of the services offered by the gatekeepers. RAS, as described in ITU Recommendation H.225, defines these services as address translation, admissions control, bandwidth control, and zone management.

Gatekeepers can also play a role in multi-point communications. To support multi-point conferences, users may employ a gatekeeper to receive control channels from two terminals in a point-to-point conference, as described in ITU Recommendation H.245. When the conference switches to multi-point, the gatekeeper can direct the H.245 control channel to a multi-point controller, or MC. The gatekeeper need not process the H.245 signaling; it only needs to pass the H.245 signals between the terminals or between the terminals and the MC.

LANs containing gateways can also contain a gatekeeper to translate incoming E.164 addresses to transport addresses. Because a zone is defined by its gatekeeper, H.323 entities that contain an internal gatekeeper require a mechanism to disable the internal function so that if there are multiple H.323 entities that contain a gatekeeper on a LAN, the entities can be configured into the same zone. Tables 1 and 2 shown below illustrate required and optional gatekeeper functions, respectively.

TABLE 1

Required Gatekeeper Functions

| | |
|---|---|
| Address Translation | Translation of an alias address to a transport address using a table that is updated with registration messages. Other methods of updating the translation table are also allowed. |
| Admissions Control | Authorization of LAN access using Admissions Request, Confirm and Reject (ARQ/ARC/ARJ) messages. LAN access can be based on call authorization, bandwidth, or some other criteria. Admissions Control can also be a null function that admits all requests. |
| Bandwidth Control | Support for Bandwidth Request, Confirm and Reject (BRQ/BCF/BRJ) messages. This can be based on bandwidth management. Bandwidth Control can also be a null function which accepts |

TABLE 1-continued

Required Gatekeeper Functions

| | |
|---|---|
| Zone Management | all requests for bandwidth changes. The gatekeeper provides the above functions for terminals, MCUs, and gateways which have registered within its zone of control. |

TABLE 2

Optional Gatekeeper Functions

| | |
|---|---|
| Call Control Signaling | In a point-to-point conference, the gatekeeper can process Q.931 call control signals. Alternatively, the gatekeeper can send the endpoints' G.931 signals directly to each other. |
| Call Authorization | The gatekeeper can reject a call from a terminal based on the Q.931 specification. The reasons for rejection can include, but are not limited to, restricted access to/from particular terminals or gateways, restricted access during certain periods of time. The criteria for determining if authorization passes or fails is outside the scope of H.323. |
| Bandwidth Management | The gatekeeper can reject calls from a terminal if it determines that sufficient bandwidth is not available. This function also operates during an active call if a terminal requests additional bandwidth. The criteria for determining if bandwidth is available is outside the scope of H.323. |
| Call Management | The gatekeeper can maintain a list of ongoing H.323 calls in order to indicate that a called terminal is busy or to provide information for the Bandwidth Management function. |

Because gatekeepers execute on one or more physical machines, the processing ability of a gatekeeper is limited. In light of all of the important functions performed by a gatekeeper, it is preferable to define methods for controlling gatekeeper message processing and for preventing the gatekeeper from crashing during overload conditions. As used herein, the phrases "overload conditions" and "overloaded state" refer to the consumption of a percentage of gatekeeper processing capacity. For example, if the processing capability of the machine on which the gatekeeper executes is seventy percent consumed, the gatekeeper might be determined to be in an overloaded state.

One conventional method for preventing a gatekeeper from crashing during overload conditions is to cease accepting incoming messages when the gatekeeper is overloaded. One problem with this approach is that there is no mechanism for favoring calls in progress over newly originating calls. As a result, calls that are almost complete are abandoned with equal frequency as newly originating calls. The equal frequency of abandonment wastes network resources and results in loss of revenue by the service provider.

Another conventional approach for managing a network gatekeeper in overload conditions is to discard messages received by a gatekeeper based on message type. One problem with this approach is that the message type alone does not determine the semantics of the message. For example, a Setup message normally corresponds to a call origination. However, if emergency 911 is active, the Setup message can be a reconnect to the emergency operator, as opposed to a new call request. A management program that identifies and discards Setup messages based on message type only can thus discard emergency 911 reconnect Setup messages in addition to new origination Setup messages. Discarding emergency 911 reconnect Setup messages is undesirable. Because the message type alone might not provide sufficient information to determine whether to discard an incoming message, discarding calls based solely on message type might not be an effective way to regulate gatekeeper message processing during overload conditions.

Accordingly, there exists a long felt need for methods and systems for controlling gatekeeper message processing during overload conditions.

DISCLOSURE OF THE INVENTION

The present invention provides methods and systems for controlling gatekeeper message processing, especially during overload conditions. In order to reduce the likelihood of gatekeeper failure in overload conditions, lines of defense can be provided for regulating incoming message traffic. One line of defense includes discarding incoming messages in a manner structured to favor calls in progress over newly originating calls. Another line of defense includes prioritizing calls based on user profile or called party destination address. Prioritizing incoming calls can include preferentially allocating gatekeeper processing resources to calls of higher priority. Another line of defense can include detecting and discarding abandoned calls.

According to another aspect, the present invention can include methods and systems for detecting gatekeeper faults. For example, in order to determine whether a gatekeeper's network protocol stack is functioning properly, a ping message can be transmitted to the gatekeeper. In order to determine whether the gatekeeper is capable of receiving calls, a Gatekeeper Confirm (GCF) message can be transmitted to the gatekeeper.

Accordingly, it is therefore an object of the present invention to provide novel methods and systems for regulating gatekeeper message processing.

BRIEF DESCRIPTION OF THE DRAWINGS

A description of the present invention will now proceed with reference to the accompanying figures of drawings of which:

FIG. 13 is a flow chart illustrating a zone manager fault detector according to an embodiment of the present invention.

DETAILED DESCRIPTION OF THE INVENTION

Figure 2:
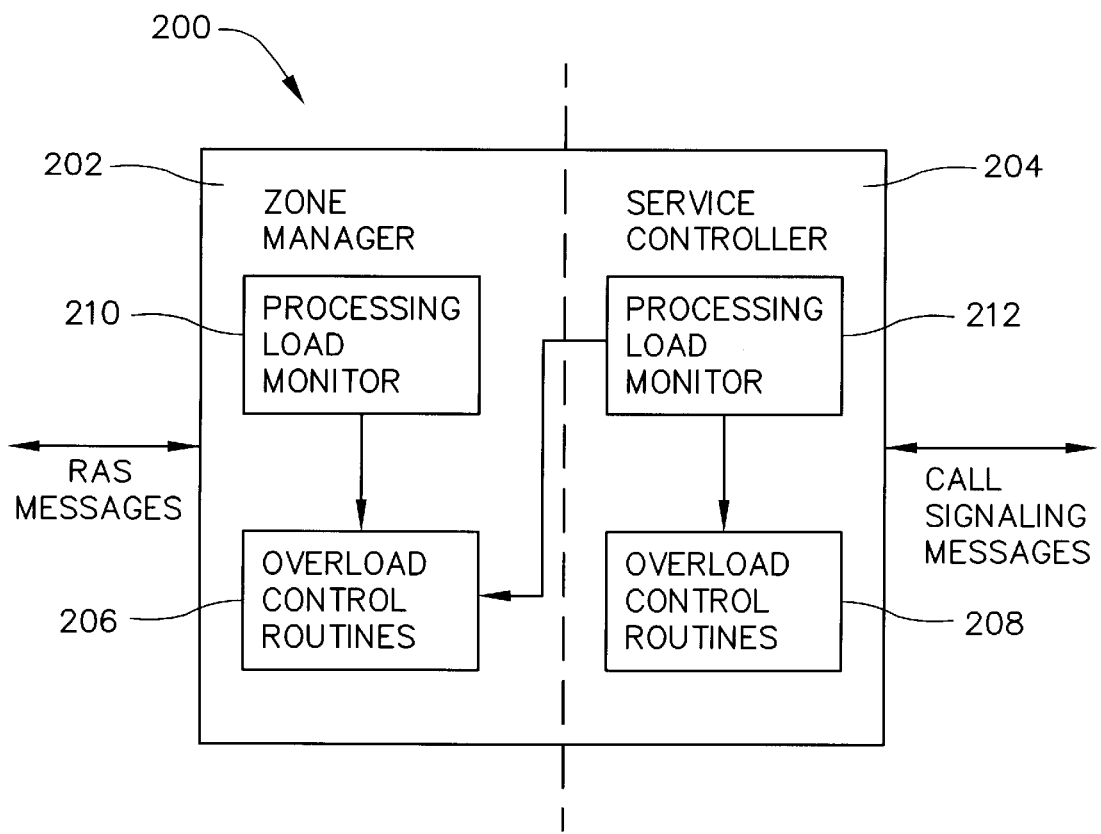
FIG. 2 is a block diagram of a gatekeeper including a zone manager and a service controller having overload control routines according to an embodiment of the present invention.

FIG. 2 illustrates a network gatekeeper including overload control routines according to an embodiment of the present invention. In FIG. 2, a network gatekeeper generally designated 200 can comprise one or more processes executing on a single machine or a plurality of machines. For example, the gatekeeper can execute on one or more personal computers. Gatekeeper 200 can be capable of providing multi-media communication services over a packet-based network that does not provide guaranteed quality of service. In a preferred embodiment, gatekeeper 200 comprises an H.323 gatekeeper. In FIG. 2, gatekeeper 200 includes a zone manager 202 and a service controller 204. Zone manager 202 comprises a process or collection of processes within gatekeeper 200 that perform RAS functions within a zone. Service controller 204 comprises a process or collection of processes within gatekeeper 200 that perform call signaling functions. Specific functions performed by zone manager 202 and the service controller 204 will be described in more detail below.

According to a preferred embodiment of the present invention, zone manager 202 includes one or more overload control routines 206 for controlling zone manager message processing when gatekeeper 200 is in an overloaded condition. Overload control routines 206 can be variously configured. For example, overload control routines 206 can include routines for prioritizing incoming calls based on a user profile or a called party. Overload control routines 206 can also include routines that favor calls in progress over newly originating calls. The specific structure of overload control routines 206 will be discussed in more detail below.

In order to determine whether overload conditions exist at the zone manager or the service controller, both the zone manager and the service controller preferably include processing load monitors. For example, in the illustrated embodiment, zone manager 202 includes a processing load monitor 210 that determines whether the zone manager is in an overloaded condition and the extent of the processing load on the zone manager. Service controller 204 preferably also includes a processing load monitor 212 to determine whether the service controller is in an overloaded condition and the extent of the service controller processing load. Processing load monitors 210 and 212 can use any indicator to determine whether zone manager 202 and service controller 204 are overloaded and the extent of the processing loads. For example, both processing load monitors 210 and 212 can measure the percentage of CPU capacity being consumed or the remaining CPU capacity in the machine(s) executing zone manager 202 and service controller 204. Based on the percentages measured by processing load monitors 210 and 212, zone manager 202 and service controller 204 can execute one or more of overload control routines 206 and 208.

Zone Manager/Service Controller Communications

Because zone manager 202 and service controller 204 can be separate processes that can execute on separate machines, it is preferable that service controller 204 communicate its available processing capacity to zone manager 202. Any manner of communicating available processing capacity from service controller 204 to zone manager 202 is within the scope of the invention. For example, if zone manager 202 and service controller 204 have access to the same memory, processing load monitor 212 of service controller 204 can set a flag that indicates available or consumed service controller processing capacity. Zone manager 202 can periodically check the flag to determine the available or consumed processing capacity of service controller 204. Alternatively, processing load monitor 212 of service controller 204 can transmit a message to zone manager 202 to communicate available service controller processing capacity to zone manager 202. Communicating available or consumed service controller processing capacity to zone manager 202 enables zone manager 202 to implement initial lines of defense against gatekeeper failure based on the processing load on service controller 204.

Figure 3:
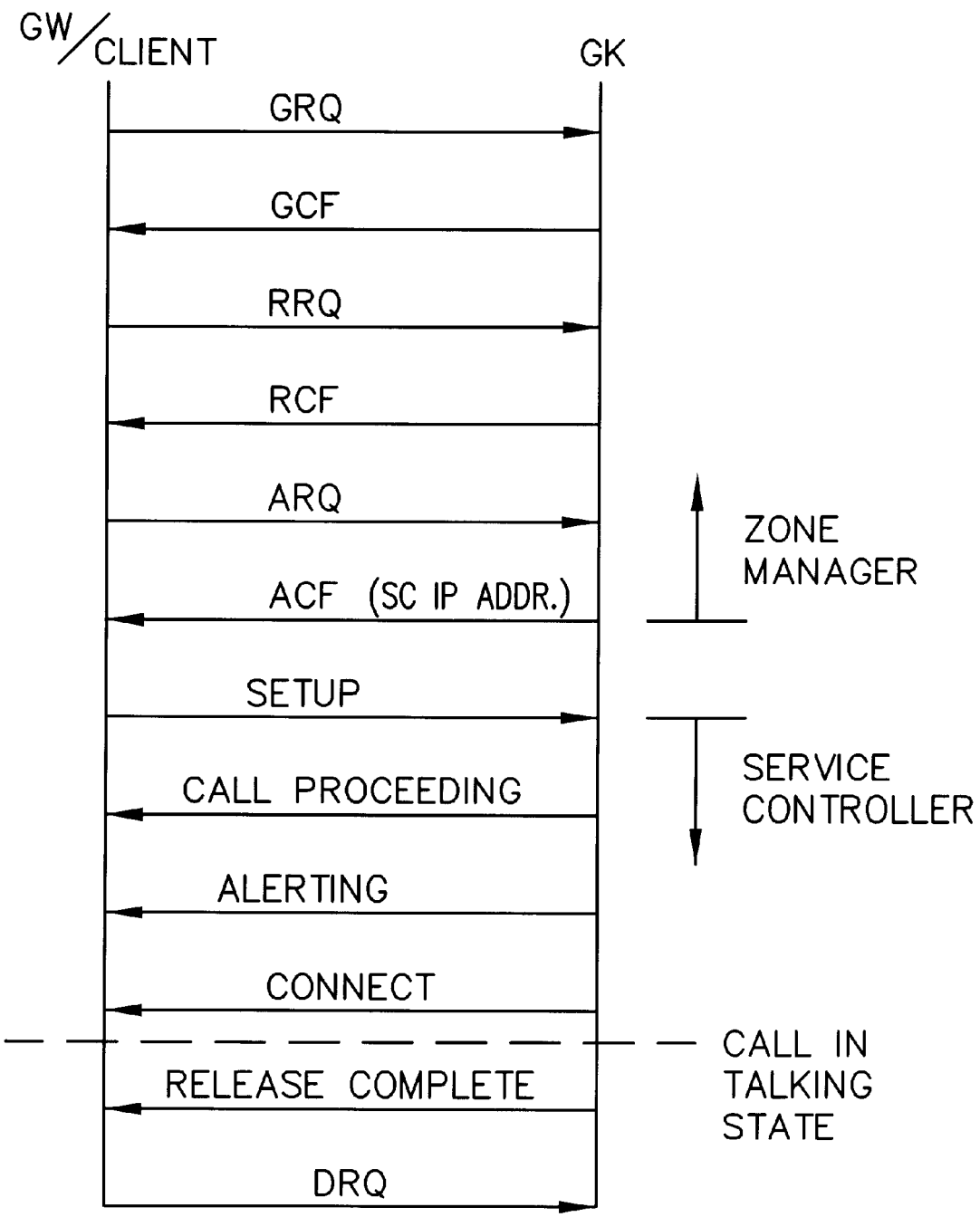
FIG. 3 is a flow diagram illustrating message flow between a calling party and a gatekeeper for a typical H.323 call.

The overload control routines, such as overload control routines 206 and 208, according to the present invention regulate gatekeeper message processing based on a number of criteria, including message content and relationships between messages in a call. Thus, a typical H.323 call sequence will now be described as FIG. 3 illustrates a typical call sequence between an H.323 client and a gatekeeper. The call sequence in FIG. 3 illustrates gatekeeper routed signaling, which is the type of signaling to which the overload control routines according to the present invention are preferably applied.

In order to initiate a call on an H.323 network, a client, such as a telephone, a computer, or a video conferencing terminal, must discover the network gatekeeper and register with the network gatekeeper. In order to discover the network gatekeeper, the client transmits a Gatekeeper Request (GRQ) message to the network gatekeeper. The zone manager of the network gatekeeper responds with a Gatekeeper Confirm message (GCF) indicating the transport address of the gatekeeper RAS channel. After identifying the gatekeeper, in order to register with the gatekeeper, the client sends a Registration Request (RRQ) to the gatekeeper through the RAS channel. The zone manager of the gatekeeper responds with a Registration Confirm (RCF) indicating that the client is registered and can proceed to make a call. The client then transmits an Admissions Request (ARQ) message that asks the zone manager for permission to make a call, specifies the bandwidth for the call, and the destination of the call. If the zone manager accepts the call, the zone manager responds with an Admissions Confirm (ACF) message. The Admissions Confirm message includes the IP address of the service controller portion of the gatekeeper.

An exemplary implementation of a gatekeeper separated into a zone manager and a service controller is described in commonly-assigned, co-pending U.S. patent application Ser. No. 09/249,051, filed Feb. 12, 1999 and entitled, "System and Method for Providing Service Control to a Single Telephone End Terminal from Multiple Service Providers", the disclosure of which is incorporated herein by reference in its entirety.

In response to receiving the Admissions Confirm message, the client sends a Setup message to the service controller. The service controller responds by sending a Call Proceeding message to the client. The Call Proceeding message informs the client that the service controller is searching for the called party address. Once the service controller locates the called party, the service controller presents the called party with the call and transmits an Alerting message to the client. The Alerting message informs the client that the called party has been presented with the call. If the called party is a telephone, the Alerting message indicates that the called party's telephone is ringing. When the called party answers the call, the service controller transmits a Connect message to the client. Once the client receives the Connect message, the client can transmit voice, video, and/or data to the called party over the H.323 network. When the called party goes on-hook, the service controller sends a Release Complete message to the client. In response to receiving the Release Complete message, the client sends a Disengage Request (DRQ) message to the service controller. The DRQ message instructs the service controller to deallocate any bandwidth previously allocated for the call.

Overload Control Routines

As stated above, both the zone manager and the service controller preferably include one or more overload control routines. The overload control routines are preferably executed in a predetermined hierarchy based on available or consumed zone manager and service controller processing capacity. For example, the zone manager processes RAS messages, and the service controller processes call signaling messages. Since RAS messages occur before call signaling messages in a call, fewer gatekeeper resources have been expended on a call at the RAS message processing stage than at the call signaling processing stage. Thus, it is preferable to execute zone manager overload control routines before service controller overload control routines. In addition, hierarchies preferably exist within the zone manager and the service controller overload control routines that favor the processing of messages relating to calls for which more resources have been expended.

Figure 4:
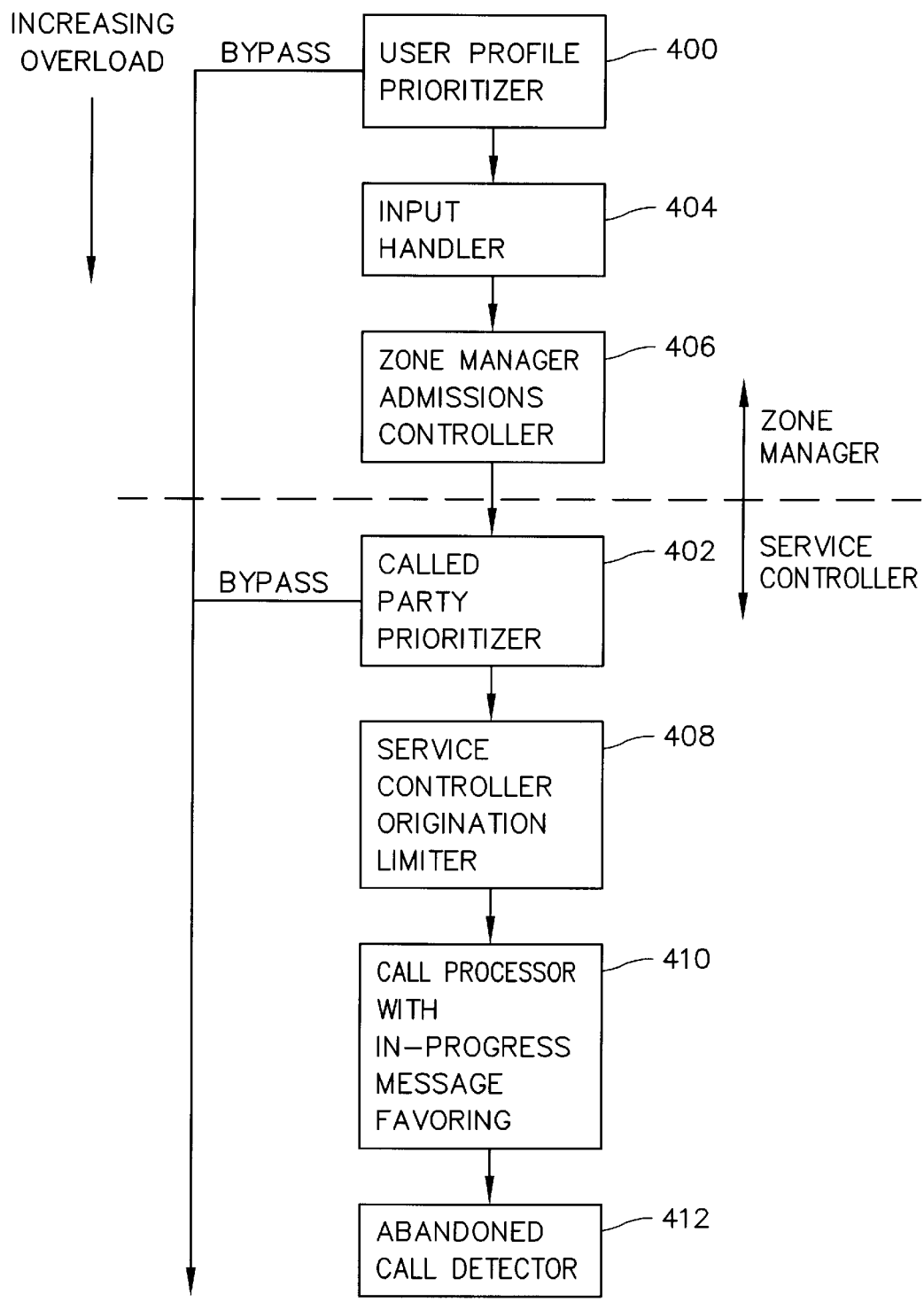
FIG. 4 is a flow chart illustrating an exemplary hierarchy for overload control routines according to an embodiment of the present invention.

FIG. 4 illustrates an exemplary hierarchy for overload control routines according to an embodiment of the present invention. In FIG. 4, the routines above the dashed line are included in the zone manager, and the routines below the dashed line are included in the service controller. A user profile prioritizer 400 is a routine included in the zone manager that bypasses the overload control routines when a call is from a priority user. Similarly, a called prioritizer 402 bypasses overload control routines below the called party prioritizer 402 in FIG. 4 when the call is to a priority destination, such as an emergency 911 operator. The remaining routines in FIG. 4 represent a series of gates through which messages must pass in order to be processed by the gatekeeper. One or more of the routines may be simultaneously active in order to reduce the likelihood of gatekeeper failure.

User Profile Prioritizer

User profile prioritizer 400 is included in the zone manager to prevent messages relating to calls from priority users from being discarded. For example, an executive employed by a corporation having an H.323 network can be considered a high-priority user. As a result, calls originating from the corporate executive's telephone can be given priority over calls originating from a lower-level employee's telephone. Resources in the zone manager can be reserved in advance for processing calls from priority users.

Figure 5:
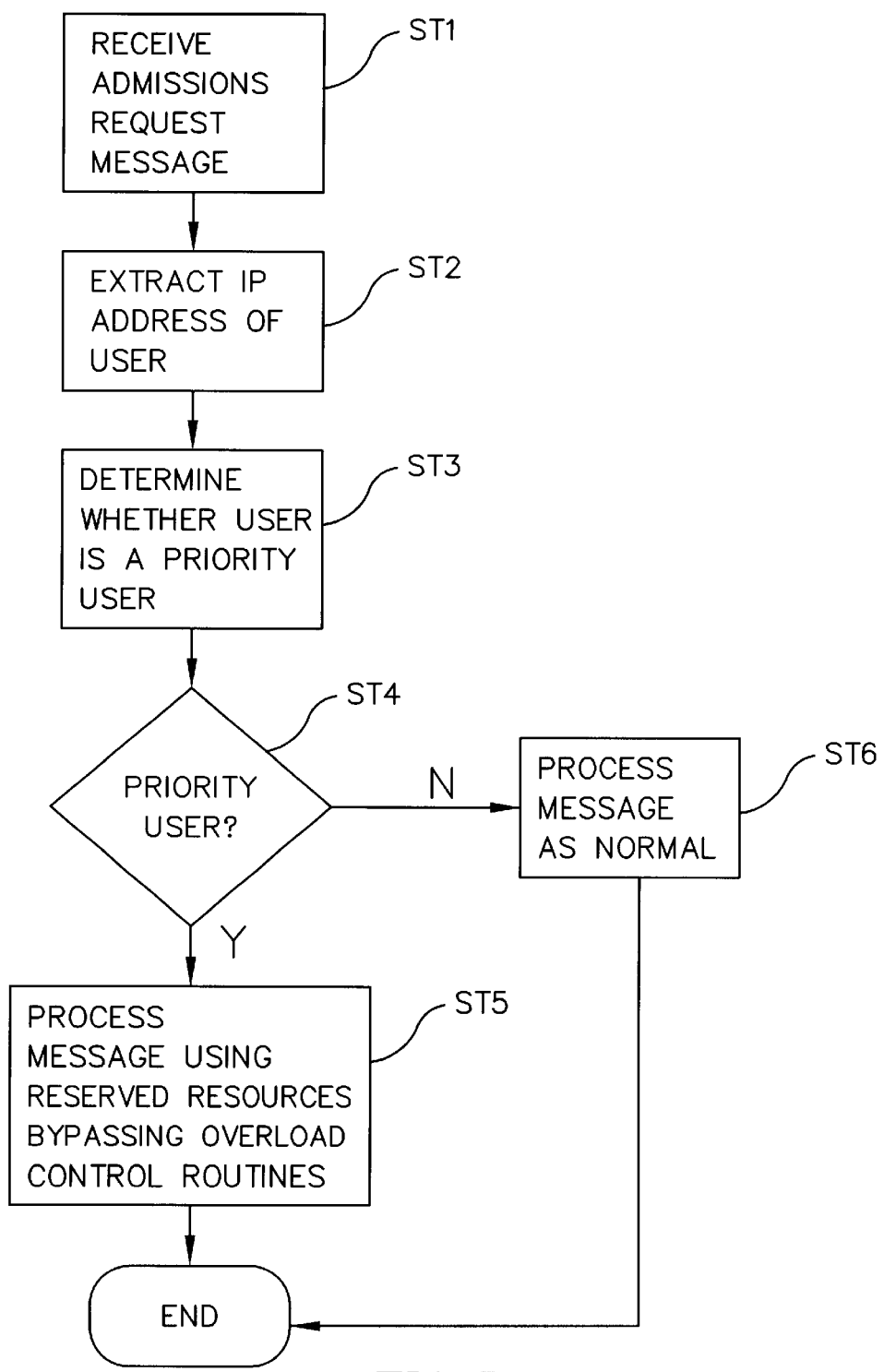
FIG. 5 is a flow chart illustrating a user profile prioritizer according to an embodiment of the present invention.

FIG. 5 illustrates an exemplary user profile prioritizer that may be included in the zone manager of a network gatekeeper. In step ST1, the user profile prioritizer receives an incoming call Admissions Request. The incoming call Admissions Request can include the IP address of the call originator. In step ST2, the user profile prioritizer extracts the IP address of the originator. In steps ST3 and ST4, the user profile prioritizer determines whether the originator is a priority user. For example, the user profile prioritizer can compare the IP address of the originator to a plurality of IP addresses stored in a lookup table to determine a profile for the call originator. If the profile indicates that the user is a priority user, such as a corporate executive, the user profile prioritizer can process the message using reserved resources (step ST5) and bypass the remaining overload control routines illustrated in FIG. 4. Exemplary resources that can be reserved include gatekeeper processor time and memory needed to process a call. If the IP address does not indicate that the originator is a priority user, the call can be processed normally (step ST6), i.e., without bypassing the overload control routines. The user profile prioritizer ensures that messages from priority users are processed even when the gatekeeper enters an overloaded condition.

Input Handler

Since RAS messages are the initial messages in a call, and the zone manager handles RAS messages, a first line of defense in gatekeeper overload conditions may be to limit incoming RAS messages. Referring back to FIG. 4, the zone manager may include an input handler 404 that preferentially discards RAS messages based on the amount of processing resources expended on the call to which the RAS messages pertain. For example, input handler 404 can preferentially discard RAS messages relating to newly originating calls over RAS messages relating to calls in progress.

Figure 6:
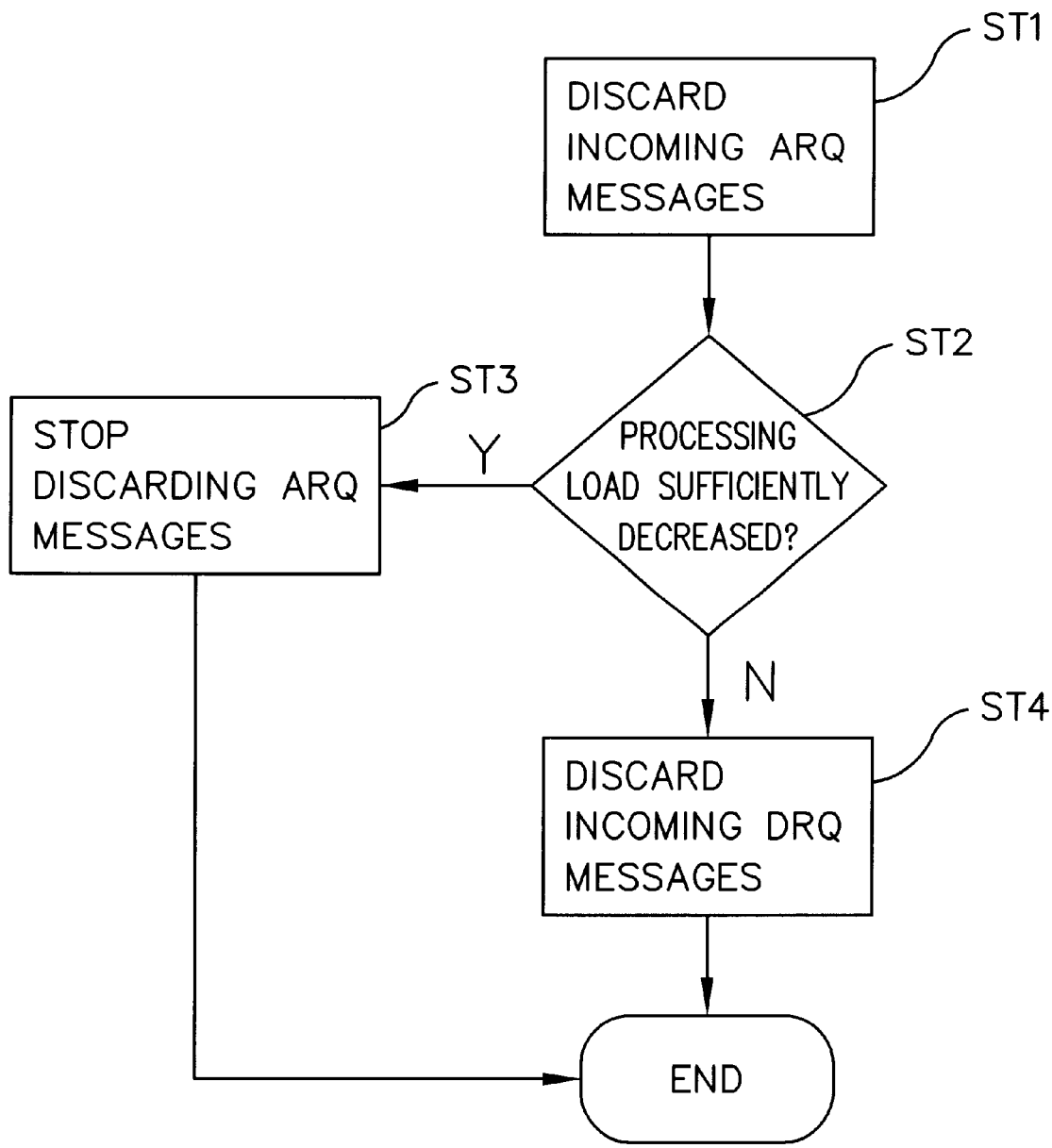
FIG. 6 is a flow chart illustrating an input handler according to an embodiment of the present invention.

FIG. 6 illustrates exemplary steps that can be performed by input handler 404, according to an embodiment of the present invention. The steps illustrated in FIG. 6 can be executed when zone manager or service controller processing load reaches a first level, for example, ninety percent of total processing capacity. When this threshold is reached, the input handler can preferentially discard ARQ messages over DRQ messages. Referring back to FIG. 3, an ARQ message can represent a new origination and a DRQ message is associated with a call in progress. ARQ messages can be distinguished from DRQ message by examining the message type field of an incoming RAS message. Thus, identifying and distinguishing between ARQ and DRQ messages requires minimal processing by the input handler.

In step ST1 of FIG. 6, the input handler can discard incoming ARQ messages in order to reduce zone manager or service controller processing load. If processing load decreases below the level that triggered the input handler, the input handler can stop discarding ARQ messages (steps ST2 and ST3). If discarding incoming ARQ messages is not sufficient to reduce processor load below the triggering threshold, the input handler can discard incoming DRQ messages (step ST4).

Zone Manager Admissions Controller

Figure 7:
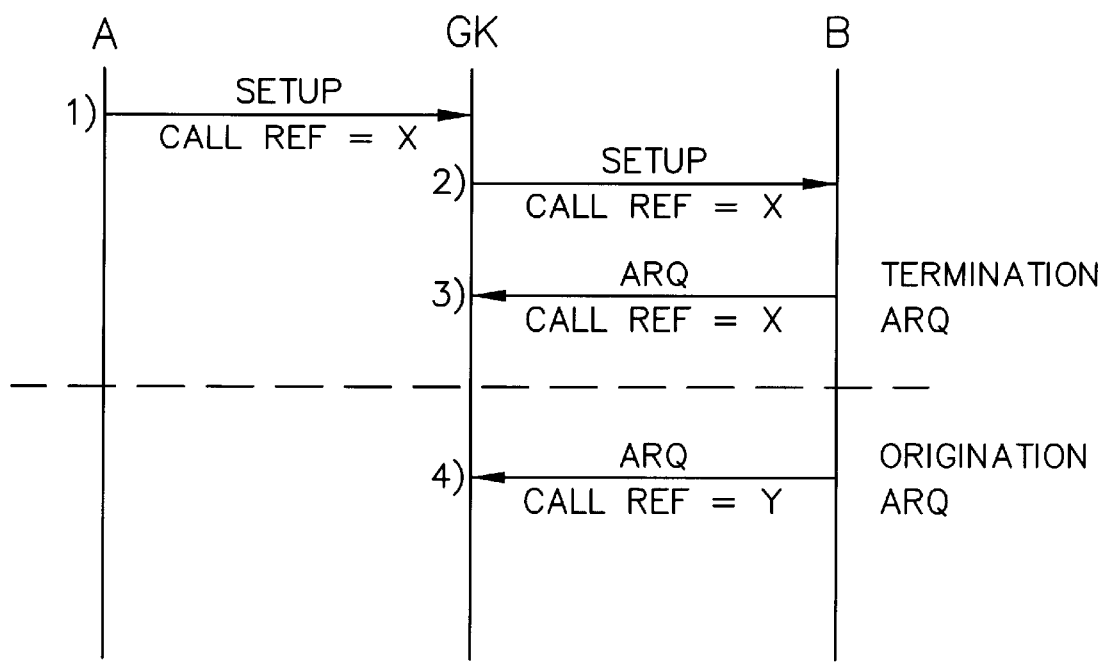
FIG. 7 is a flow diagram illustrating origination and termination ARQ messages.

A second line of defense that can be implemented with regard to ARQ messages is a zone manager admissions controller that preferentially discards origination ARQ messages over termination ARQ messages. FIG. 7 is a flow diagram illustrating the difference between origination and termination ARQs. In line 1), a first terminal, terminal A, in an H.323 zone transmits a Setup message to a gatekeeper directing the gatekeeper to set up a call with a second terminal, terminal B. The Setup message includes a call reference value of X. The call reference value is a number included in messages that identifies the call to which the messages pertain. In line 2), the gatekeeper responds by transmitting a Setup message to terminal B with the call reference value of X. In line 3), terminal B responds to the Setup by transmitting an ARQ to the gatekeeper with the call reference value of X. The ARQ message illustrated in line 3) is referred to as a termination ARQ because it is transmitted by a called party. Since the zone manager receives ARQ messages and the service controller receives Setup messages, identifying termination ARQ messages can require communication between the zone manager and the service controller of the gatekeeper.

The dashed line in FIG. 7 represents a division between the first call and a second call. In line 4), terminal B transmits an ARQ message to the gatekeeper for a new call. The ARQ has a call reference value of Y. The ARQ message illustrated in line 4) is an origination ARQ because it is transmitted by a calling party to establish a new call. Because more call processing resources have been expended on a termination ARQ than an origination ARQ, the gatekeeper admissions limiter preferably discards origination ARQs before discarding termination ARQs.

Figure 8:
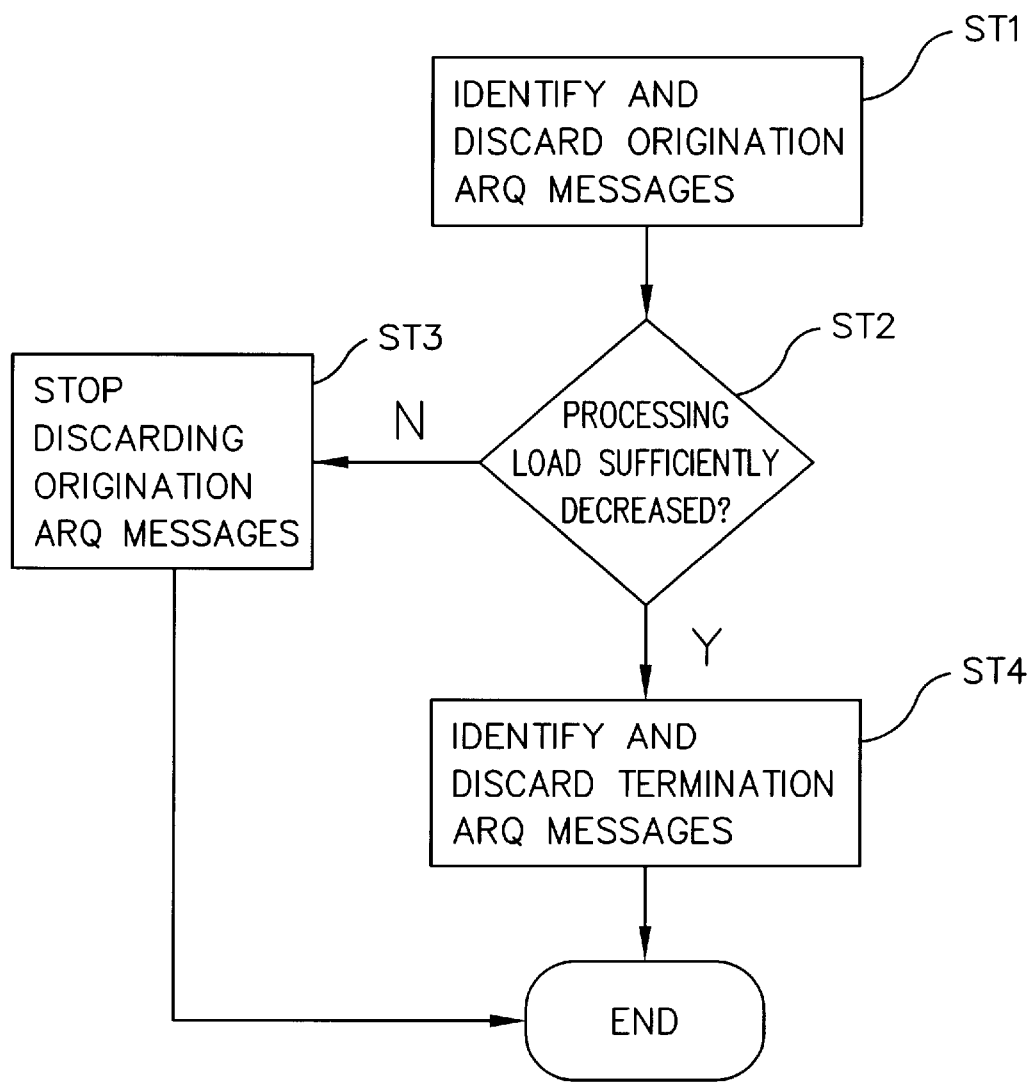
FIG. 8 is a flow chart illustrating a zone manager admissions controller according to an embodiment of the present invention.

As illustrated in FIG. 4, zone manager admissions controller 406 can be executed when the processor load of the zone manager and/or the service controller reaches a second state, higher than the state required to trigger execution of the input handler illustrated in FIG. 6. FIG. 8 illustrates exemplary steps that can be executed by a zone manager admissions controller according to an embodiment of the present invention. In step ST1, the zone manager admissions controller identifies and discards origination. ARQ messages. Identifying ARQ messages can include examining the message type to determine whether the message is an ARQ and examining the call reference value to determine whether the message relates to a new call. If a message is an ARQ for a new call, the zone manager admissions controller preferably discards the ARQ message. In step ST2, the zone manager admissions controller determines whether the processing load of the zone manager or the service controller has sufficiently decreased, e.g., whether the processing load is below the threshold that triggered the zone manager admissions controller. If discarding originating ARQs causes the percentage of available processing capacity to increase, the zone manager admissions controller can stop discarding origination ARQs (step ST3). If the processing capacity is not sufficiently increased or, alternatively, if the processing load is not sufficiently decreased, then the zone manager admissions controller preferably identifies and discards termination ARQs, in addition to origination ARQs (step ST4). By favoring the processing of termination ARQs over origination ARQs, the zone manager admissions controller efficiently regulates gatekeeper message processing at the zone manager level.

Called Party Prioritizer

Figure 9:
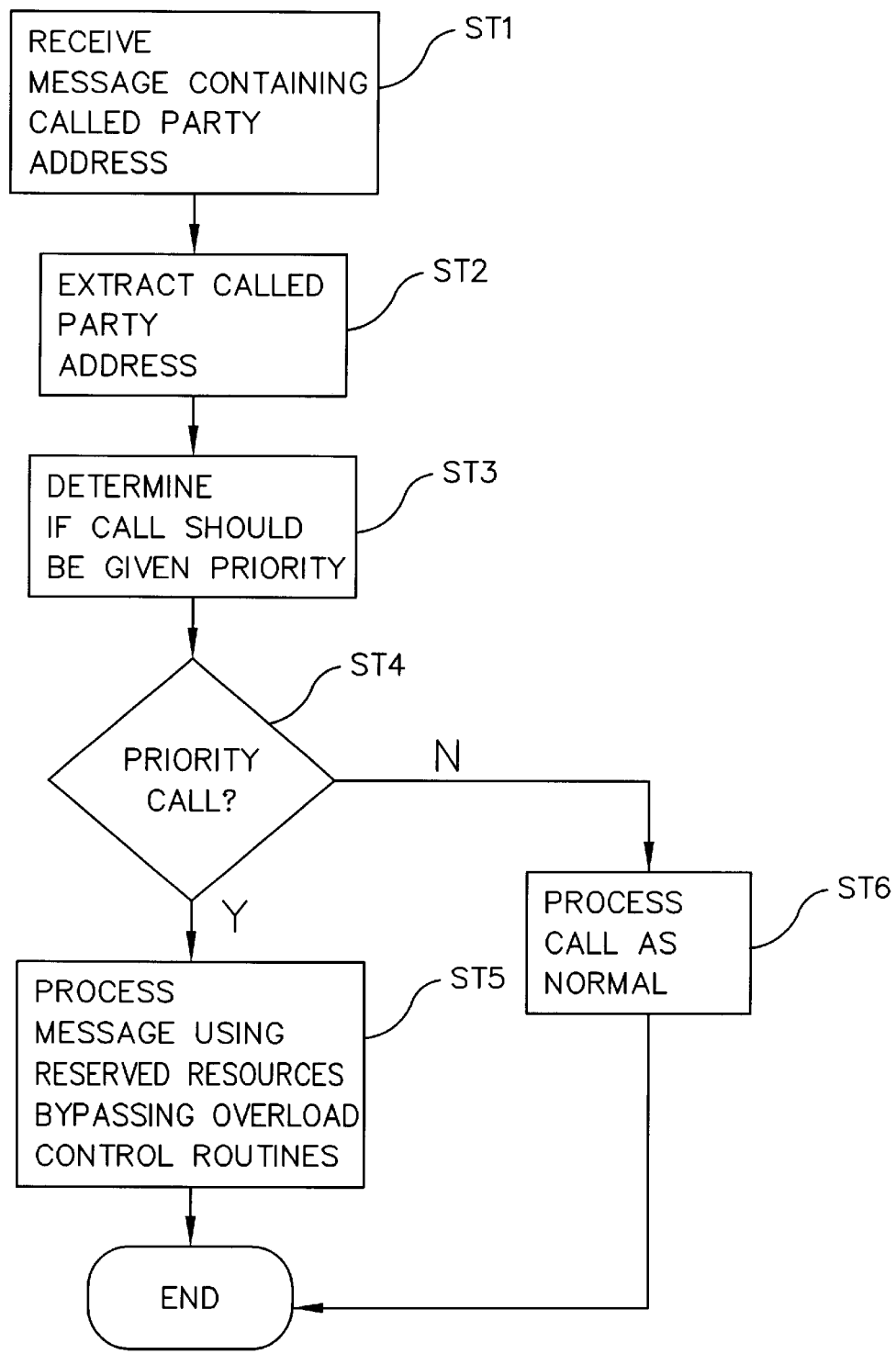
FIG. 9 is a flow chart illustrating a called party prioritizer according to an embodiment of the present invention.

Referring back to FIG. 4, the next level of message processing regulation is called party prioritizer 402. Called party prioritizer 402 can be a component of the service controller of the gatekeeper that prevents messages addressed to a priority destination, such as an emergency 911 operator, from being discarded. FIG. 9 illustrates exemplary steps that can be included in a called party prioritizer according to an embodiment of the present invention. In step ST1, the called party prioritizer receives a message containing the address of a called party. The message can be a Setup message or one of the messages that follows a Setup message in an H.323 call. In step ST2, the called party prioritizer extracts the called party address from the message. In steps ST3 and ST4, the called party prioritizer determines whether the call should be given priority based on the called party address. Determining whether the call should be given priority can include searching a lookup table for the called party address to determine whether the address belongs to an important call destination, such as an emergency 911 operator. If the call is determined to be a priority call, the called party prioritizer processes the message using resources reserved for the call and bypasses the overload control routines below the called party prioritizer illustrated in FIG. 4 (step ST5). The reserved resources may include processing time and/or memory accessible by the gatekeeper. If the called party prioritizer determines that the message is not addressed to a priority destination, the message is processed as normal, i.e., without reservation of resources (step ST6). Because the called party prioritizer identifies messages that relate to priority destinations for processing using reserved resources, these messages are protected from being discarded by the remaining overload control routines illustrated in FIG. 4.

Service Controller Origination Limiter

Referring back to FIG. 4, another overload control routine that can be included in the service controller of a network gatekeeper is service controller origination limiter 408. Service controller origination limiter 408 limits the number of new calls accepted by the service controller in order to allow the service controller to allocate more CPU time for calls in progress. Service controller origination limiter 408 can be invoked when the processing load on the service controller reaches a threshold value greater than the threshold value for invoking zone manager admissions controller 406.

Figure 10:
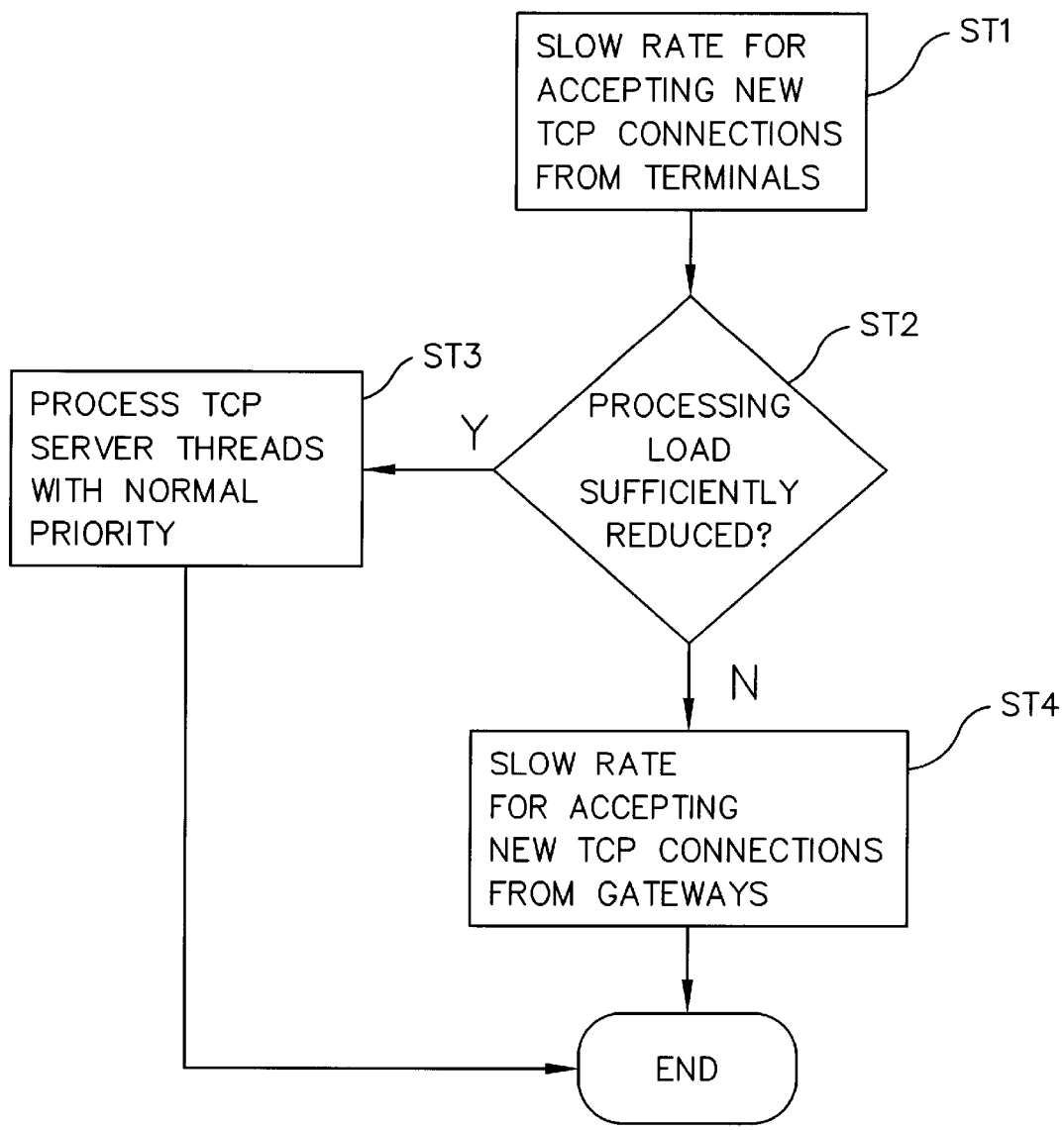
FIG. 10 is a flow chart illustrating a service controller origination limiter according to an embodiment of the present invention.

FIG. 10 is a flow chart illustrating exemplary steps that may be performed by a service controller origination limiter according to an embodiment of the present invention. In step ST1, the service controller origination limiter slows the rate for accepting new TCP connections from terminals. In a multi-threaded environment, slowing the rate for accepting new TCP connections from terminals can include lowering the priority for processing server threads that accept new TCP connections from terminals. Slowing the rate for accepting new TCP connections from terminals allows the service controller to allocate more processor time for calls in progress. In step ST2, it is determined whether service controller processing load has been sufficiently reduced. If service controller processing load has been sufficiently reduced, the service controller origination limiter can process TCP server threads with normal priority (step ST3). If service controller processing load has not been sufficiently reduced, the service controller origination limiter can slow the rate for accepting new TCP connections from gateways (step ST4).

Figure 1:
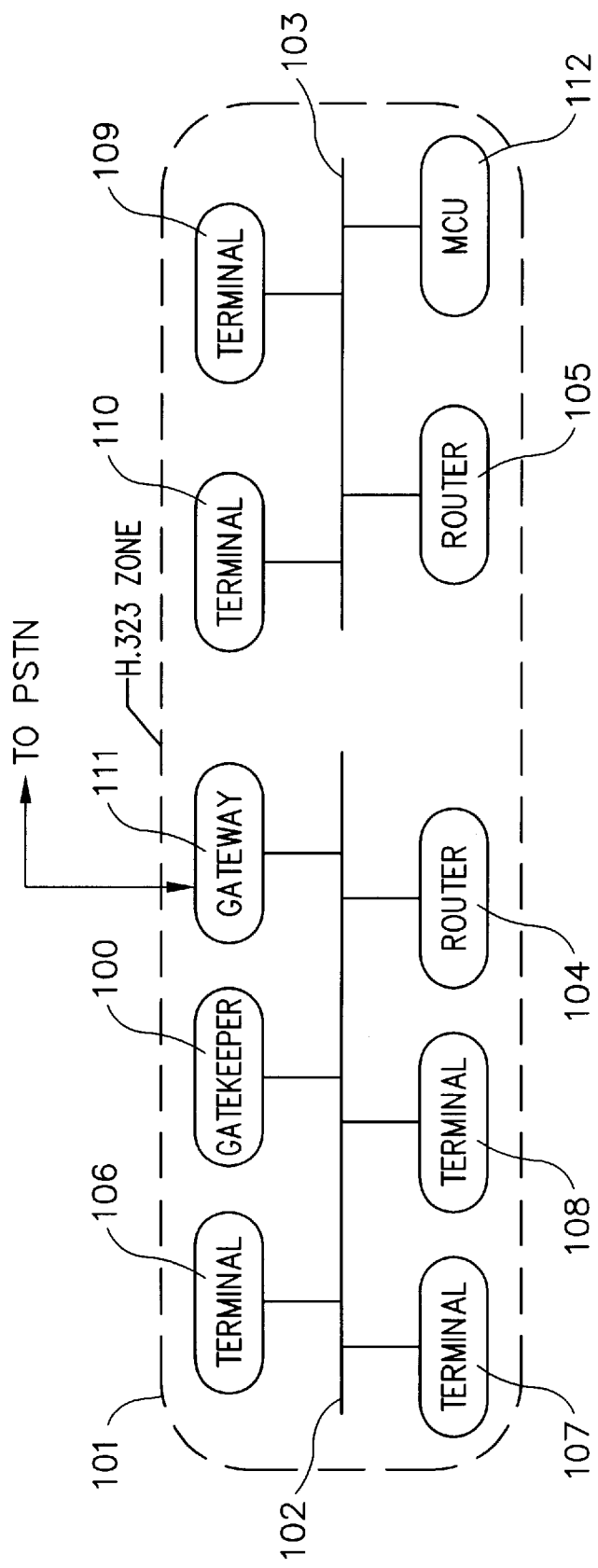
FIG. 1 is a block diagram illustrating a gatekeeper and conventional H.323 zone.

Referring back to FIG. 1, gateways translate between communications protocols, such as public switched telephone network protocols and H.323 protocols. Greater total network resources are expended on calls made from the PSTN network to the H.323 network than calls made between terminals in the H.323 network. This is the reason that the service controller origination limiter preferably slows the rate for accepting TCP connections from terminals in the H.323 zone before slowing the rate for accepting new TCP connections from gateways. Thus, the service controller origination limiter illustrates one method for efficiently regulating message processing at the service controller level.

In regulating message processing at the service controller level, it is preferable that if a Setup message is discarded, the user is not billed for the call, even though bandwidth has been reserved when an ARQ message for a call is successfully processed. For example, an ARQ message can be successfully processed by the zone manager and the Setup message can be discarded by the service controller. The user is preferably not billed in this situation because the call was not made. One way to ensure that the user is not billed is to provide a billing routine that checks whether a call is made, rather than checking whether a call sequence contains an ARQ and DRQ to allocate and de-allocate network bandwidth.

Call Processor with In-Progress Message Favoring

Referring back to FIG. 4, another level of protection that can be provided by the service controller is a call processor with in-progress message favoring 410. Call processor with in-progress message favoring 410 processes messages received by the service controller in a manner that favors calls in progress over newly originating calls. Call processor with in-progress message favoring 410 can be invoked when the service controller processing load reaches a threshold greater than the threshold required for invoking service controller origination limiter 408.

Figure 11:
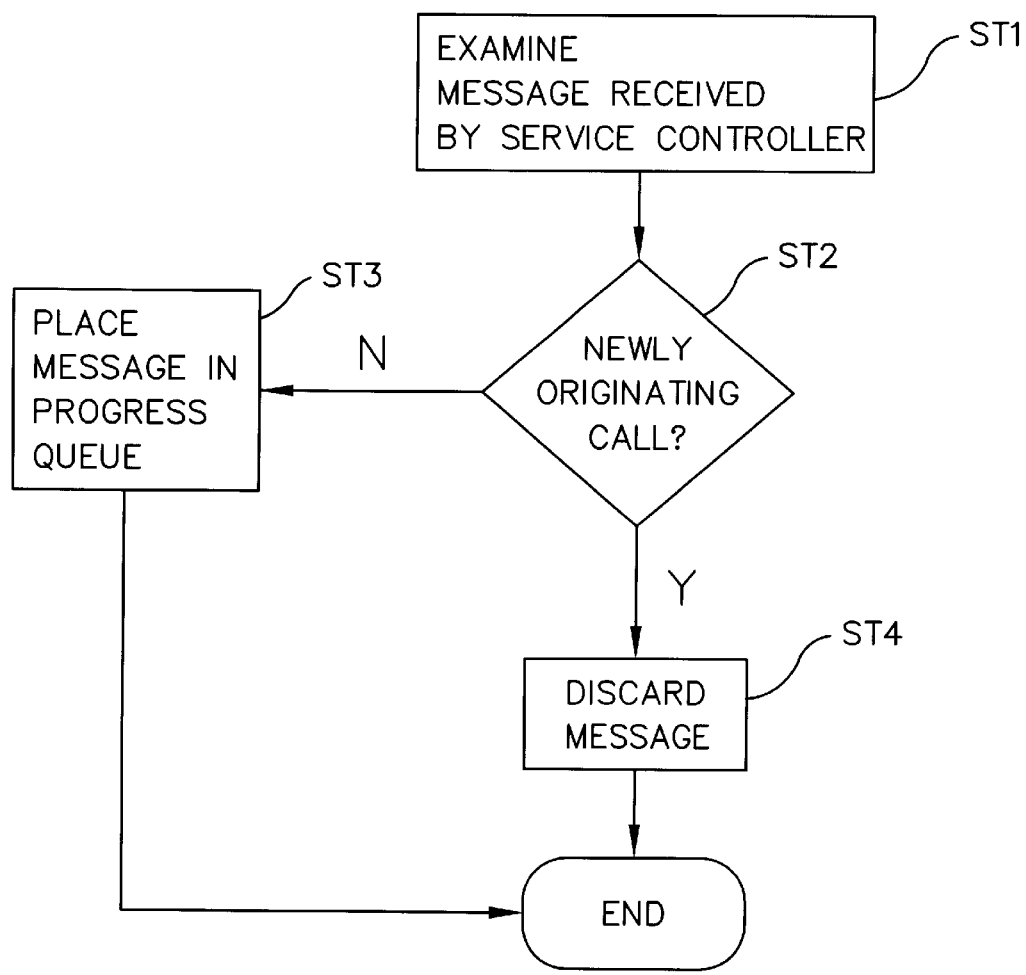
FIG. 11 is a flow chart illustrating a call processor with in-progress message favoring according to an embodiment of the present invention.

FIG. 11 illustrates exemplary steps that can be performed by a call processor with in-progress message favoring. In step ST1, the call processor examines a message received by the service controller. In step ST2, the call processor determines whether or not the message is part of a newly originating call. Determining whether the message is part of a newly originating call is preferably performed in a manner that requires little processing by the service controller. For example, it is preferable that the call processor not create any new objects or parse the entire message. One method for efficiently determining whether the message is part of a newly originating call is to examine the message header and determine the message type. If the message is a Setup message, the message can be determined to be part of a newly originating call. If the message is a message that follows a Setup message, e.g., Call Proceeding, Alerting, Connect, or Release Complete, the message is determined not to be part of a newly originating call. Another method for determining whether the message is part of a newly originating call is to determine whether the connection has a call processing owner, which represents a context established from processing of the previous messages. If the TCP connection for the message has a call processing owner, then the message represents progress work. If the TCP connection does not have a call processing owner, then the message is determined to be part of a newly originating call.

If the message is determined to be part of a call in progress, the message is placed in a progress queue(step ST3). The service controller responds to messages in the progress queue. The progress queue is a queue maintained by the service controller for storing call signaling messages to be processed. In step ST4, if the message is determined to be part of a newly originating call, the message is discarded. Thus, the call processor with in-progress message favoring efficiently regulates calls at the service controller level.

The present invention is not limited to the steps illustrated in FIG. 11 for favoring calls in progress over newly originating calls. For example, the call processor with in-progress message favoring may discard the oldest origination message in the origination queue, since the oldest message is most likely to be abandoned first. The oldest origination message in the origination queue may be identified and discarded when the message is extracted from the origination queue, rather than processing the message. In cases of extreme overload, the call processor with in progress message favoring may discard messages before placing the messages in the origination queue.

The call processor with in-progress message favoring is preferably customizable by applications. For example, an essential lines application may influence the prioritizing conditions so that messages from essential lines will not be discarded. This customizing may be accomplished by allowing plug-ins to the call processor from applications. Another case in which it may be desirable to customize call processing is emergency 911 calls.

Abandoned Call Detector

Referring back to FIG. 4, another level of protection that can be provided by service controller is an abandoned call detector 412. Abandoned call detector 412 detects calls that have been abandoned by the calling party. For example, when a calling party goes off-hook, the calling party can transmit a Setup message to the gatekeeper. If the called party does not receive a dial tone within a short period of time, the calling party can assume that his or her telephone is not functioning properly. As a result, the calling party can hang up, i.e., go on-hook, resulting in a Release Complete message being transmitted to the gatekeeper. Accordingly, if the gatekeeper receives a Setup message immediately followed by a Release Complete message pertaining to the same call, the gatekeeper can assume that the call has been abandoned. This is just one of the ways that the gatekeeper can detect abandoned calls.

Figure 12:
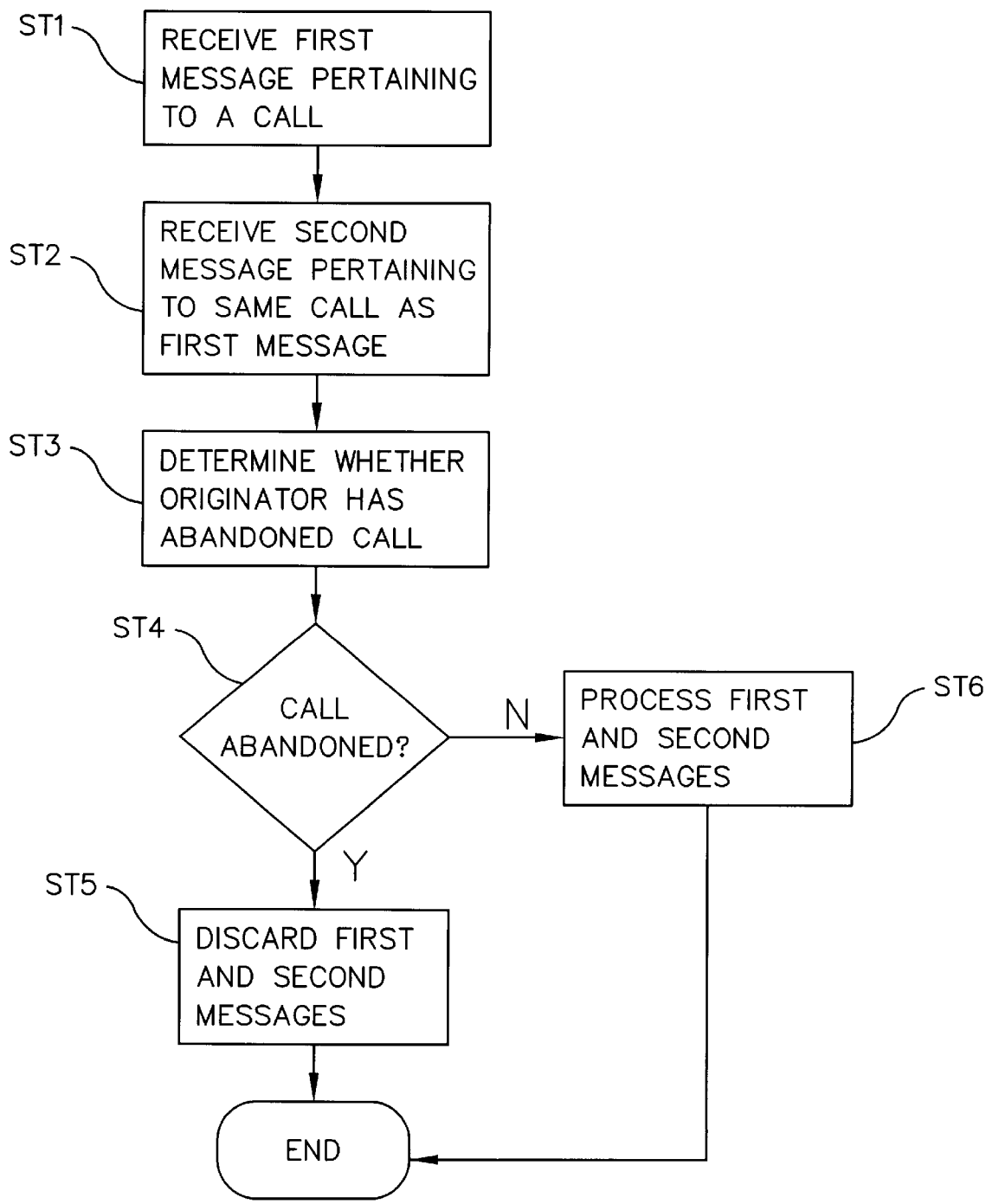
FIG. 12 is a flow chart illustrating an abandoned call detector according to an embodiment of the present invention.

FIG. 12 illustrates exemplary steps that can be performed by an abandoned call detector according to an embodiment of the present invention. In step ST1, the abandoned call detector receives a first message associated with a call and stores the call reference value associated with the message. As discussed above, the call reference value is a number included in all messages associated with a call. In H.323, the first message associated with a call can be a Setup message or an origination ARQ message. In addition to storing the call reference value, if the abandoned call detector uses the above-described method for identifying abandoned calls based on timing between messages, the abandoned call detector can also store a time value indicative of when the first message was received.

In step ST2 of FIG. 12, the abandoned call detector receives the next message pertaining to the same call. Identifying the next message pertaining to the same call may include examining the call reference values of each incoming message and comparing the incoming call reference values with the call reference value of the first message. Once the next message pertaining to the same call has been received, the abandoned call detector determines whether or not the message indicates that the call has been abandoned (steps ST3 and ST4).

Determining whether the call has been abandoned can be accomplished in any number of ways. For example, the abandoned call detector can look at the time that the second message was received. If the difference between the times of receipt of the first and second messages is less than a predetermined value, the abandoned call detector can assume that the call has been abandoned. For example, referring back to FIG. 3, once the client transmits a Setup message, the client has to wait for call Proceeding, Alerting, and Connect messages from the gatekeeper. Transmitting these messages to the client can require a predetermined time period, during which the calling party is supposed to remain idle. Thus, if any message is received from the client during that time period, the call can be assumed to be abandoned. Another method for determining whether the call has been abandoned is determining whether the second message is a Release Complete message. Yet another method for determining whether the call has been abandoned can include examining the difference in time of receipt between the first and second messages and the message type of the second message. For example, if a Setup message is immediately followed by a Release Complete message pertaining to the same call, then the call is likely to have been abandoned. In step ST5, if the call has been abandoned, the abandoned call detector preferably discards all messages associated with the call. In step ST6, if the abandoned call detector determines that the call has not been abandoned, the abandoned call detector preferably places the message in a queue to be processed.

The present invention is not limited to the steps illustrated in FIG. 12 for determining whether a call is abandoned. For example, the abandoned call detector can receive an origination message and remember its call reference value and time of receipt. If a predetermined time period elapses before another message is received pertaining to the same call, the abandoned call detector can assume that the call has been abandoned by the calling party. When this occurs, the abandoned call detector preferably discards the message.

Babbling Terminal Removal

Another overload control routine that can be included in the service controller is a routine that detects when a terminal sends a large number of messages to a service controller due to a software or hardware error in the terminal. When this occurs, the terminal is preferably removed from the I/O system of the service controller so that the service controller will not crash. For example, the service controller can maintain a count of the number of messages received from a particular terminal within a certain time period. If the number of messages and/or number of errors within a certain time period exceeds a threshold, the service controller can refuse to accept further messages from the terminal.

Zone Manager Fault Detection

According to another aspect of the invention, a network gateway or a terminal can include a routine for determining whether the zone manager of a gatekeeper is functioning properly. FIG. 13 illustrates exemplary steps that can be performed by a zone manager fault detector according to an embodiment of the present invention. In step ST1, the zone manager fault detector transmits a ping message to the zone manager. In step ST2, the zone manager fault detector determines whether a response has been received from the zone manager. In step ST3, if a response has not been received, the zone manager fault detector determines that the protocol stack of the zone manager is down. As a result, there is no need to continue further testing and the zone manager fault detector ends.

If the zone manager fault detector receives a response to the ping message, the zone manager fault detector determines that the protocol stack of the zone manager is functioning properly (step ST4). In step ST5, the zone manager fault detector transmits a GRQ to the zone manager to determine whether the zone manager applications are functioning properly. In step ST6, the zone manager fault detector determines whether a GCF message has been received in response to the GRQ message. If a GCF message has not been received, the zone manager fault detector determines that the zone manager applications are down (step ST7). If the zone manager fault detector receives a GCF message from the zone manager, the zone manager fault detector determines that the zone manager applications are functioning properly (step ST8). In this manner, a gateway or a terminal can determine whether its zone manager is functioning properly, at both the protocol stack level and the application level.

Other Protocols

The overload control routines for controlling network gatekeeper message processing are not limited to the H.323 protocol. For example, some of the routines are applicable to other protocols, such as the Media Gateway Control Protocol (MGCP), for example, as described in *Media Gateway Control Protocol*, Version 0.1, Internet Engineering Task Force, Feb. 21, 1999, the disclosure of which is incorporated by reference herein in its entirety. In MGCP, an entity referred to as a "call agent" or a "media gateway controller" performs similar functions to the service controller described above with regard to H.323. The MGCP call agent or media gateway controller does not have a zone manager functionality. Accordingly, any of the routines described above with regard to overload control for the service controller are applicable to an MGCP call agent or media gateway controller. For example, referring to FIG. 4, the called party prioritizer 402, the service controller origination limiter 408, the call processor with in progress message favoring 410, and the abandoned call detector 412 may each be applied to control message processing by an MGCP call agent or media gateway controller. The primary difference between applying these routines to MGCP is that the names of the messages are different from those in H.323.

Called Party Prioritizer

The steps performed by a called party prioritizer to prioritize resources for calls to priority destinations are similar to those illustrated and described for the called party prioritizer of FIG. 9. However, rather than extracting the called party address from a Setup message, the MGCP called party prioritizer extracts the MGCP message containing the dialed digits. The MGCP message that contains the dialed digits is the notify message.

Call Agent or Media Gateway Controller Origination Limiter

The steps performed by an origination limiter to limit new originations in an MGCP-compliant network are similar to those illustrated and described for the service controller originations limiter of FIG. 10. However, MGCP is UDP based, rather than TCP based. Accordingly, rather than slowing the rate for accepting TCP connections, an MGCP originations limiter may slow the rate for accepting UDP messages. That is, the new originations limiter first slows the rate for accepting UDP messages from MGCP gateways and then slows the rate for accepting UDP messages from MGCP terminals or endpoints.

Call Processor with In-Progress Message Favoring

The steps performed by a call processor with in-progress message favoring configured to favor calls in progress over newly originating calls in an MGCP-compliant network are similar to those illustrated and described for the call processor of FIG. 11. In order to identify whether a message relates to a call in progress or a newly originating call, the MGCP call processor may determine whether a context has been established for the call. In MGCP, receipt of the Notify message may establish a call context. Subsequent messages with the same call ID parameter as the Notify message are identified as in-progress messages. Notify messages with new call ID parameters are identified as new origination messages. When an overload condition occurs, the new origination messages are preferably discarded, and the in-progress messages are retained for further processing.

Abandoned Call Detector

The steps performed by an abandoned call detector configured to detect abandoned calls in an MGCP-compliant network are similar to those illustrated and described for the abandoned call detector of FIG. 12. For example, in order to detect abandoned calls in an MGCP-compliant network, the abandoned call detector may look for two messages pertaining to the same call that are closely spaced in time to each other. If the messages are close in time to each other, the first message may be assumed to be a message pertaining to an off-hook condition, and the second message me be assumed to be a message corresponding to an on-hook condition. The MGCP message that indicates to the call agent that a user is on-hook or off-hook is the Notify message. A parameter within the Notify message identifies whether the user is on-hook of off-hook. The other methods for identifying whether a call is abandoned with regard to H.323 apply equally to MGCP. For example, if a predetermined time period has passed since a message corresponding to an off-hook condition has been received, the call may be determined to be abandoned. In yet another alternative, the abandoned call detector may examine the message type to determine whether a call has been abandoned. Once a call is identified as abandoned, the abandoned call detector preferably discards the message or messages pertaining to the call.

It will be understood that various details of the invention may be changed without departing from the scope of the invention. Furthermore, the foregoing description is for the purpose of illustration only, and not for the purpose of limitation—the invention being defined by the claims.

What is claimed is:

1. A gatekeeper including a zone manager and a service controller, the zone manager comprising computer executable instructions embodied in a computer readable medium for performing steps comprising:
   (a) processing registration, admission, status (RAS) messages received by the zone manager over a network; and
   (b) when the zone manager or the service controller enters an overloaded state, processing the RAS messages in a manner favoring calls in progress over newly originating calls, and wherein the service controller comprises computer executable instructions embodied in a computer readable medium for performing steps comprising:
      (i) processing call signaling messages received over the network; and
      (ii) when the service controller enters an overloaded state, processing the call signaling messages in a manner favoring calls in progress over newly originating calls.

2. The gatekeeper of claim 1, wherein processing the RAS messages includes identifying whether a calling party is a priority user and, in response to determining that the calling party is a priority user, processing messages from the calling party using resources reserved for the calling party.

3. The gatekeeper of claim 1, wherein processing the RAS messages includes preferentially discarding Admissions Request (ARQ) messages over Deallocation Request (DRQ) messages.

4. The gatekeeper of claim 1, wherein processing the RAS messages includes preferentially discarding origination Admissions Request (ARQ) messages over termination ARQ messages.

5. The gatekeeper of claim 1, wherein processing the call signaling messages includes identifying whether a called destination is a priority destination and, in response to determining that the destination is a priority destination, processing messages to the called destination using reserved gatekeeper resources.

6. The gatekeeper of claim 1, wherein processing the call signaling messages includes slowing the rate for accepting new TCP connections from terminals in the network.

7. The gatekeeper of claim 6, comprising, after slowing the rate for accepting new TCP connections from terminals in the network, determining whether processing load of the service controller is reduced below a threshold value, and in response to determining that the processing load is not reduced below the threshold value, slowing the rate of accepting new TCP connections from gateways in the network.

8. The gatekeeper of claim 1, wherein processing the call signaling messages includes determining whether a message relates to a newly originating call or a call in progress, and in response to determining that the message relates to a newly originating call, discarding the message.

9. The gatekeeper of claim 1, comprising communicating service controller processing load to the zone manager and when service controller processing load exceeds a threshold value, processing the RAS messages in a manner that favors calls in progress over newly originating calls.

10. The gatekeeper of claim 1, wherein processing RAS messages includes processing RAS messages received through an H.323 network.

11. The gatekeeper of claim 1, wherein processing call signaling messages comprises processing call signaling messages received through an H.323 network.

12. A network gatekeeper comprising:
   (a) first processing means for processing registration, admissions, status (RAS) messages received over a network;
   (b) second processing means for processing call signaling messages received over the network;
   (c) means for monitoring processing loads of the first and second processing means; and
   (d) first control means associated with the first processing means for processing the RAS messages in a manner favoring calls in progress over newly originating calls when the means for monitoring indicates that the processing load of the first processing means or the processing load of the second processing means exceeds a threshold value, said first control means further comprising means for identifying whether a calling party is a priority user and, in response to determining that the calling party is a priority user, processing messages from the calling party using resources reserved for the calling party.

13. The network gatekeeper of claim 12 comprising second control means associated with the second processing means for processing call signaling messages in a manner favoring calls in progress over newly originating calls when the means for monitoring indicates that the processing load of the second processing means exceeds a threshold value.

14. The network gatekeeper of claim 12 wherein first control means comprises means for preferentially discarding Admissions Request (ARQ) messages over Deallocation Request (DRQ) messages.

15. The network gatekeeper of claim 12 wherein the first control means comprises means for preferentially discarding origination Admissions Request (ARQ) messages over termination ARQ messages.

16. The network gatekeeper of claim 13 wherein the second control means comprises means for identifying whether a called destination is a priority destination and, in response to determining that the destination is a priority destination, processing messages to the called destination using reserved gatekeeper resources.

17. An input handler for regulating the processing of messages received by a network gatekeeper during overload conditions, the input handler comprising computer executable instructions embodied in a computer readable medium for performing steps comprising:
  (a) in response to determining that a processing load of the gatekeeper exceeds a first threshold, discarding first RAS messages received by the network gatekeeper, wherein the first RAS messages are ARQ messages;
  (b) determining whether the processing load is reduced below a second threshold smaller than the first threshold; and
  (c) in response to determining that the processing load is not decreased below the second threshold, discarding second RAS messages received by the network gatekeeper, wherein the second RAS messages are DRQ messages.

18. The network gatekeeper of claim 13 wherein the second control means comprises means for slowing the rate for accepting new TCP connections from terminals in the network.

19. The input handler of claim 17, wherein determining whether the processing load of the gatekeeper is reduced below the second threshold includes receiving messages indicative of the processing load of a zone manager and a service controller of the gatekeeper.

20. The input handler of claim 17, wherein discarding the first RAS messages includes discarding the first RAS messages received from an H.323 network.

21. The input handler of claim 17, wherein discarding the second RAS messages includes discarding the second RAS messages received from an H.323 network.

22. A zone manager admissions controller for regulating message processing of a gatekeeper during overload conditions, the zone manager admissions controller comprising computer executable instructions embodied in a computer readable medium for performing steps comprising:
  (a) in response to determining that processing load of the gatekeeper exceeds a first threshold, identifying and discarding origination ARQ messages received by the zone manager;
  (b) determining whether the processing load is decreased below a second threshold smaller than the first threshold; and
  (c) in response to determining that the processing load is not below the second threshold, identifying and discarding DRQ messages received by the zone manager.

23. The zone manager admissions controller of claim 22, wherein identifying and discarding origination ARQ messages includes:
  (a) reading a first call reference value associated with a first ARQ message received by the gatekeeper;
  (b) determining whether messages having the first call reference value have previously been received by the gatekeeper; and
  (c) in response to determining that messages having the first call reference value have been received, identifying the first message as a termination ARQ message.

24. The zone manager admissions controller of claim 23, comprising, in response to determining that messages having the first call reference value have not been received by the gatekeeper, identifying the first message as an origination ARQ message.

25. The network gatekeeper of claim 13 wherein the second control means comprises means for determining whether a message relates to a newly originating call or a call in progress, and in response to determining that the message relates to a newly originating call, discarding the message.

26. The network gatekeeper of claim 12 wherein the network comprises an H.323 network.

27. A method for regulating message processing by an H.323 gatekeeper or a media gateway control protocol (MGCP) call agent, the method comprising:
  receiving messages over an H.323 or MGCP compliant network;
  identifying messages relating to newly originating calls and messages relating to calls in progress;
  processing the messages relating to calls in progress;
  placing the messages relating to newly originating calls in an origination queue;
  determining whether the H.323 gatekeeper or the MGCP call agent is in an overloaded condition; and
  in response to determining that the H.323 gatekeeper or the MGCP call agent is in an overloaded condition, identifying the oldest message in the origination queue and discarding the message.

28. An origination limiter for limiting new call originations to a media gateway control protocol (MGCP) call agent, the origination limiter comprising computer executable instructions embodied in a computer readable medium for performing steps comprising:
  (a) in response to determining that call agent processing load exceeds a first threshold value, slowing the rate for accepting UDP messages from MGCP terminals;
  (b) determining whether MGCP call agent processing load is reduced below a second threshold value smaller than the first threshold value; and
  (c) in response to determining that the processing load is not decreased below the second threshold value, slowing the rate for accepting UDP messages from MGCP gateways.

29. A service controller origination limiter for limiting new call originations to a service controller of a network gatekeeper, the service controller origination limiter comprising computer executable instructions embodied in a computer readable medium for performing steps comprising:
  (a) in response to determining that service controller processing load exceeds a first threshold value, slowing the rate for accepting new TCP connections from terminals managed by the gatekeeper;

(b) determining whether gatekeeper processing load is reduced below a second threshold value smaller than the first threshold value;

(c) in response to determining that the processing load is not decreased below the second threshold value, slowing the rate for accepting new TCP connections from gateways managed by the gatekeeper;

(d) determining if a new TCP connection is from a priority user; and (e) if the new TCP connection is from a priority user, processing messages from the priority user using resources reserved for the priority user.

30. The service controller origination limiter of claim 29, wherein slowing the rate for accepting new TCP connections from terminals includes lowering processing priority for threads allocated for accepting the new TCP connections from the terminals.

31. The service controller origination limiter of claim 29, wherein slowing the rate for accepting new TCP connections from gateways includes lowering processing priority of threads allocated for accepting the new TCP connections from the gateways.

32. A call processor for processing calls received by a service controller of a network gatekeeper, the call processor comprising computer executable instructions embodied in a computer readable medium for performing steps comprising:

(a) examining a message received by the service controller to determine whether the message is indicative of a newly originating call or a call in progress;

(b) in response to determining that the message is indicative of a newly originating call, discarding the message;

(c) determining if the message received by the service controller is from a priority user;

(d) not discarding the message from the priority user even if the message is indicative of a newly originating call.

33. The call processor of claim 32, comprising, in response to determining that the message is indicative of a call in progress, placing the message in a progress queue to be processed by the service controller.

34. The call processor of claim 32, wherein examining messages received by the service controller includes examining messages received by the service controller through an H.323 network.

35. The call processor of claim 32, wherein examining the message includes determining whether the message is a Setup message, and in response to determining that the message is a Setup message, identifying the message as indicative of a newly originating call.

36. A method for regulating message processing by a network gatekeeper comprising:

(a) receiving a plurality of messages from terminals in a zone managed by the network gatekeeper;

(b) monitoring message processing load of the network gatekeeper, (c) determining whether the message processing load exceeds one or more threshold values;

(d) in response to determining that the message processing load exceeds one of the threshold values, preferentially processing incoming messages in a manner structured to favor calls in progress over newly originating calls;

(e) determining if a destination for a newly originating call is a priority destination; and (f) processing messages to the priority destination with reserved resources.

37. The method of claim 36, wherein preferentially processing incoming messages includes preferentially discarding incoming ARQ messages over incoming DRQ messages.

38. The method of claim 36, wherein preferentially processing incoming messages includes preferentially discarding incoming origination ARQ messages over incoming termination ARQ messages.

39. The method of claim 36, wherein preferentially processing incoming messages includes slowing the rate for accepting new TCP connections from the terminals.

40. The method of claim 36, wherein preferentially processing incoming messages includes discarding incoming Setup messages.

41. The method of claim 36, wherein preferentially processing incoming messages includes identifying messages relating to abandoned calls and discarding the messages relating to the abandoned calls.

42. The method of claim 36, wherein receiving a plurality of messages includes receiving a plurality of messages through an H.323 network.

* * * * *